(12) United States Patent
Collins

(10) Patent No.: US 8,074,584 B2
(45) Date of Patent: Dec. 13, 2011

(54) WATER HEATER STAND AND ASSEMBLY THEREOF

(75) Inventor: John D. Collins, Sturgeon Bay, WI (US)

(73) Assignee: C&S Manufacturing Corporation, Sturgeon Bay, WI (US)

( * ) Notice: Subject to any disclaimer, the term of this patent is extended or adjusted under 35 U.S.C. 154(b) by 358 days.

(21) Appl. No.: 12/387,007

(22) Filed: Apr. 27, 2009

(65) Prior Publication Data

US 2010/0269738 A1  Oct. 28, 2010

(51) Int. Cl.
*A47B 13/00* (2006.01)
(52) U.S. Cl. ............... 108/156; 108/157.15; 108/157.16
(58) Field of Classification Search ............... 108/156, 108/157.1, 157.15, 157.16, 157.18, 158.12; 248/165, 440; 403/329, 263
See application file for complete search history.

(56) References Cited

U.S. PATENT DOCUMENTS

| | | | | |
|---|---|---|---|---|
| 1,018,212 A * | 2/1912 | Sherwood | ...................... | 248/150 |
| 1,109,765 A * | 9/1914 | Lampert | ...................... | 403/189 |
| 1,268,182 A * | 6/1918 | Treiber | ...................... | 108/156 |
| 1,523,663 A * | 1/1925 | Slama | ...................... | 403/400 |
| 1,820,103 A * | 8/1931 | Toy | ...................... | 248/163.1 |
| 1,937,935 A * | 12/1933 | Zimmerman | ...................... | 108/110 |
| 1,978,650 A * | 10/1934 | Shannon | ...................... | 108/156 |
| 2,474,668 A * | 6/1949 | Herbolsheimer | ...................... | 248/188 |
| 2,677,470 A * | 5/1954 | Catalano | ...................... | 108/62 |
| 2,680,047 A * | 6/1954 | Frum | ...................... | 108/156 |
| 3,124,110 A | 3/1964 | Buehl | | |
| 3,265,879 A * | 8/1966 | Ford et al. | ...................... | 362/150 |
| 3,420,484 A * | 1/1969 | Mattick | ...................... | 248/188 |
| 3,545,709 A | 12/1970 | Harvey | | |
| 4,021,988 A * | 5/1977 | Edeus et al. | ...................... | 52/656.4 |
| 4,068,600 A * | 1/1978 | Driscoll | ...................... | 108/192 |
| 4,119,045 A * | 10/1978 | Michelotti | ...................... | 108/156 |
| 4,243,194 A | 1/1981 | Moore, Jr. et al. | | |
| 4,955,573 A | 9/1990 | Horvath | | |
| 5,190,260 A | 3/1993 | Daubenspeck | | |
| 5,199,676 A | 4/1993 | Kowalewski | | |
| 5,344,111 A | 9/1994 | Gantzert | | |
| 5,368,263 A | 11/1994 | Harrison | | |
| 5,372,342 A | 12/1994 | Adams | | |
| 5,393,024 A | 2/1995 | Daubenspeck | | |
| 5,632,542 A * | 5/1997 | Krivec | ...................... | 312/334.7 |
| 5,645,103 A | 7/1997 | Whittaker | | |
| 5,746,405 A | 5/1998 | Dvorak et al. | | |
| 5,791,264 A * | 8/1998 | McCraney | ...................... | 108/151 |
| 6,135,410 A | 10/2000 | Harrison | | |
| 6,138,965 A | 10/2000 | Iorio et al. | | |
| 6,349,906 B1 | 2/2002 | Anderson | | |
| 6,578,802 B1 | 6/2003 | Thier | | |
| 6,647,691 B2 * | 11/2003 | Becker et al. | ...................... | 52/656.1 |
| 7,059,575 B2 | 6/2006 | Garton | | |
| D537,509 S | 2/2007 | Thielen | | |

* cited by examiner

*Primary Examiner* — Janet M Wilkens
(74) *Attorney, Agent, or Firm* — Ryan Kromholz & Manion, S.C.

(57) ABSTRACT

A stand suitable for elevated support of water heaters and similar objects is disclosed. The stand includes a planar, rectangular tabletop formed and stamped from sheet-like material, and being further formed with downwardly bent marginal side flanges. The tabletop is supported by two pairs of oppositely disposed leg members, which are also stamped from sheet-like material. Each leg member is formed with a longitudinally extending flat central portion and oppositely positioned coextensive angularly bent flange portions. The surface of each leg flange mates with an adjacent facing surface of a respective surface of a respective one of the downwardly depending tabletop flanges. The stand further includes a cruciform arrangement of overlapping crossbars.

9 Claims, 5 Drawing Sheets

US 8,074,584 B2

WATER HEATER STAND AND ASSEMBLY THEREOF

BACKGROUND OF THE INVENTION

This invention relates generally to collapsible supporting stands, including stands suitable for supporting tank-like objects, such as water heaters, which for various reasons are preferably elevated and supported above ground level.

The support stand of the present invention can be used in several different environments for supporting various objects. Additionally, the size and shape of the components of the stand can be varied to accommodate the particular needs of the buyer or user.

Prior art stands are more expensive to manufacture, and require tedious and time-consuming assembly and disassembly, usually due to requirement of a multiplicity of independently manufactured fastener devices, such as separate, conventional nut and bolt assemblies. Added to these problems have been the assembler's frustration in locating individual assorted fastener elements required for securement and releasable attachment of cooperating elements required for insuring stabilization and relative rigidity to a plurality of leg members and crossbars supporting an elevated tabletop member.

SUMMARY OF THE INVENTION

The present invention includes, in a preferred embodiment, a support stand for elevated support of a tank-like object, such as a hot water heater and its contents. Water heaters are frequently subjected to sewage backup conditions causing unsanitary drainage water to rise above, and even cover, gas fired, or electric heater units located at the lower end of the water heater tank. The supporting stand of this invention is dimensioned to provide a table top and each supporting leg member and stabilizing crossbar formed of the same sheet metal stock. The tabletop preferably has a surrounding peripheral, downwardly depending, lip or flange and two pairs of detachable, oppositely disposed leg members. The leg-members and opposite ends of a pair of stabilizing, cruciform crossbars are detachably fastened together for additional vertical and lateral support of the stand. Each leg member is preferably removably attached at its respective upper end to a downwardly bent marginal lip or flange formed in a sheet-like, planar tabletop using conventional punch press, brake press, or other known stamping procedures. These procedures and their configured peripheral margins are adapted to provide releasable attachment of respective stamped and formed corner leg members for support of the planar, galvanized, sheet steel tabletop. The detachable tabletop and leg members, as well as the detachable, stabilizing crossbar members, follow novel design configurations. These members, when separated from one another, are relatively compressed to a minimal thickness for ease in breakdown and assembly. The novel configurations further accommodate simplified and facile packaging and freight-transportable shipment of the relatively flat, die-pressed, components ready for facile assembly as a stable support stand upon arrival at final site installations.

A principal object of this invention is the provision of a singular fastener means for secure attachment of assembled cooperating supporting elements or components of a novel supporting stand comprising; a tabletop, cooperating vertical, oppositely disposed, leg members, in addition to a pair of intersecting, cruciform, stabilizing crossbars. The singular securing means preferably takes the form of a single conventional threaded nut and bolt assembly; or when circumstances permit, by means of spot welding or use of a single rivet. The singular attaching and securing component is preferably located at a centralized location of the intersecting cruciform crossbars.

BRIEF DESCRIPTION OF THE DRAWINGS

Some of the objects of the invention have been set forth above. Other objects and advantages of the invention will appear as the description proceeds when taken in conjunction with the appended drawings, in which.

DESCRIPTION OF THE PREFERRED EMBODIMENT

Figure 1:
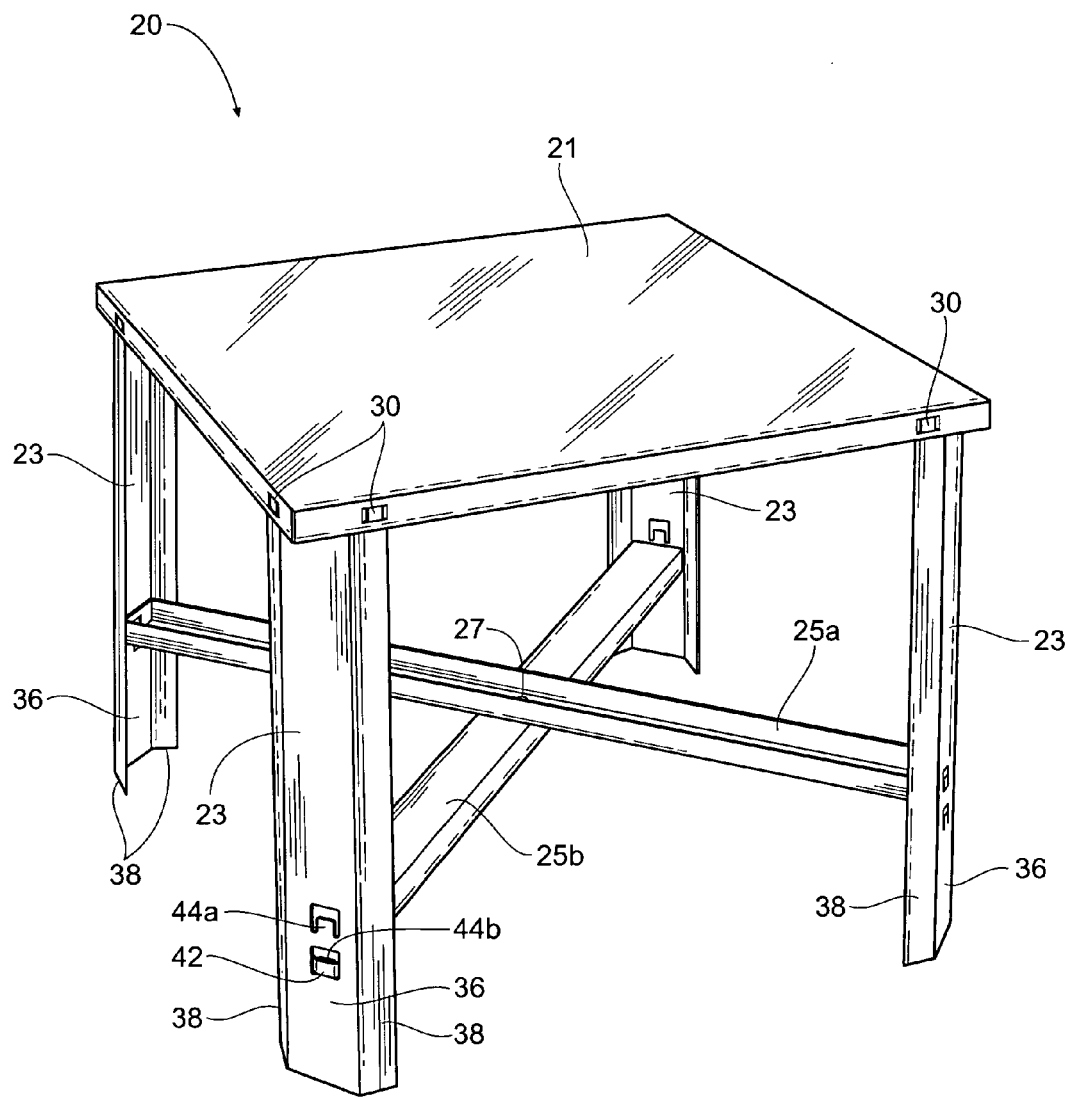
FIG. 1 is a perspective view of an assembled novel stand suitable for support of a filled hot water heater or similar tank like object.

Referring now specifically to the drawings, a support stand according to the present invention is illustrated in FIGS. 1-10, and is shown generally at reference numerals 20 and 210.

Figure 2:
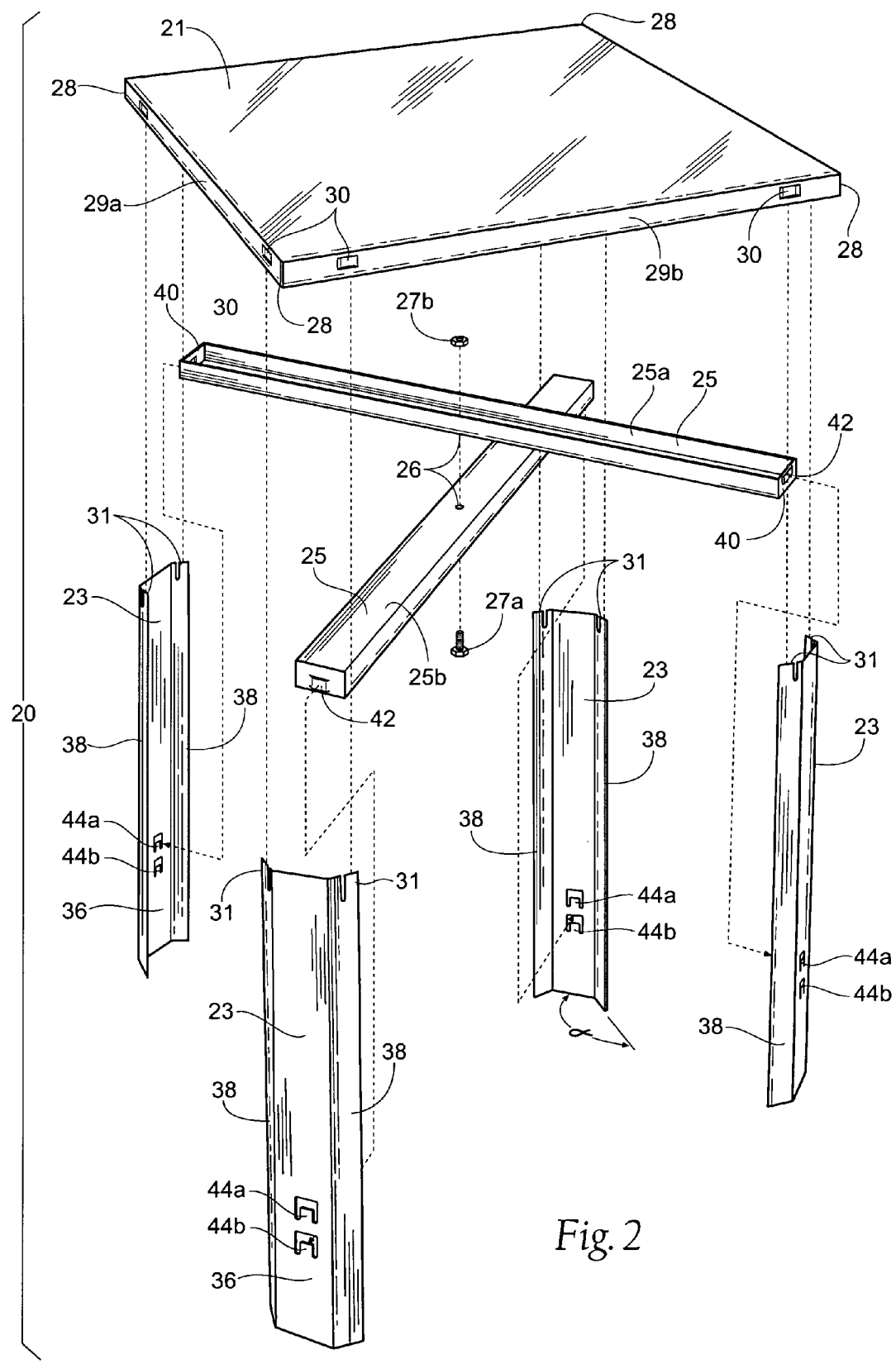
FIG. 2 is an exploded view of the various components of the novel stand, respectively aligned for assembly of the stand illustrated in the view of FIG. 1.
Figure 3:
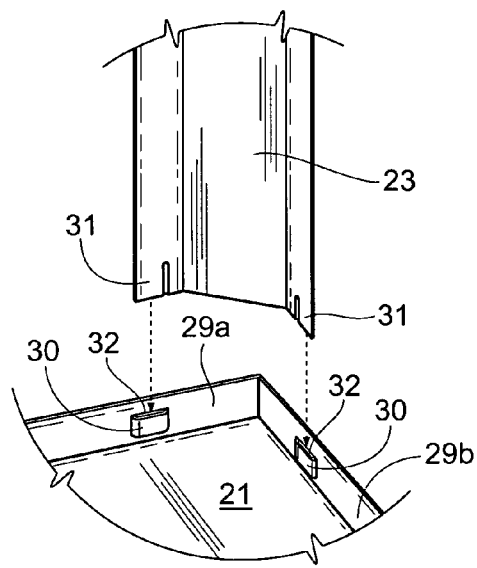
FIG. 3 is an exploded, partial perspective view, illustrating the relative position of a representative vertically supporting leg member just prior to being forcibly inserted into secure attachment of the leg member with a representative corner arrangement of a pair of juxtaposed, normally downwardly bent, corner flanges depending from an inverted rectangular tabletop.
Figure 4:
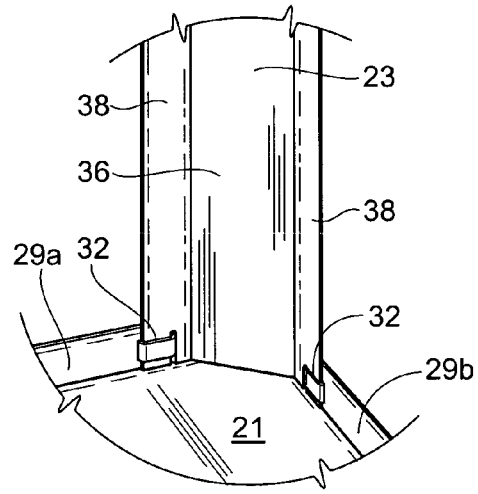
FIG. 4 is an exploded, partial perspective view, of the completed assembly and securement of the leg member of FIG. 3 with respect to the inverted tabletop corner of FIG. 3.
Figure 7:
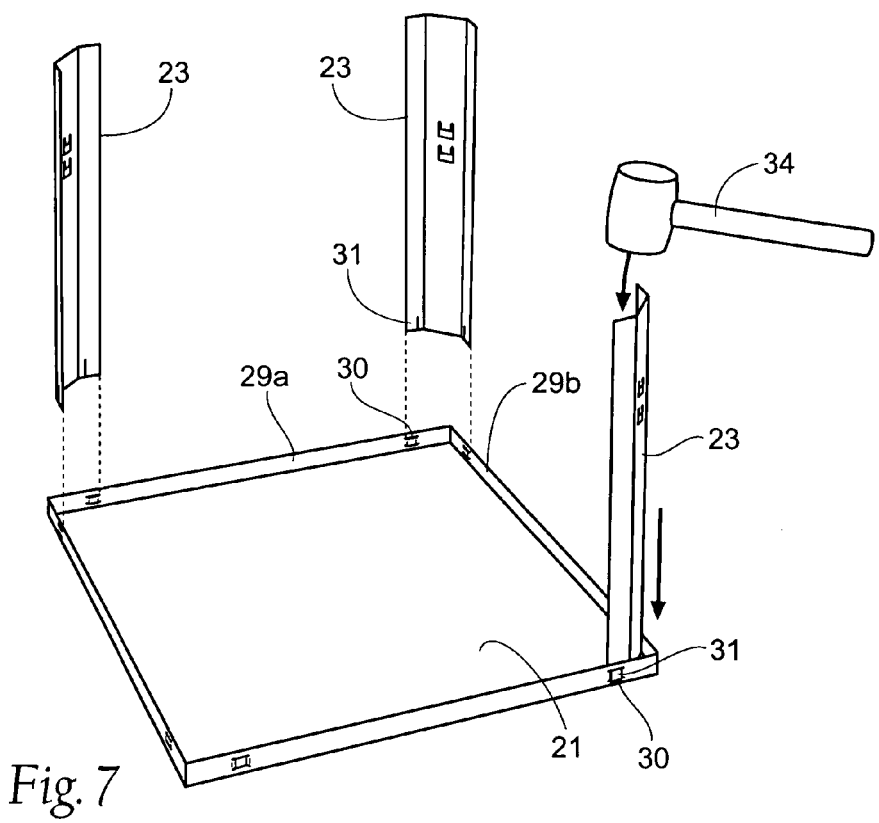
FIG. 7 is a perspective view of the stand of FIG. 1, shown in an inverted position and partially exploded relationship during a hammer-blow installation of an extended end of the selected leg member as viewed in FIGS. 3 and 4, for securement of that leg member to supporting the intersecting corner flanges of the tabletop of the inverted stand.
Figure 8:
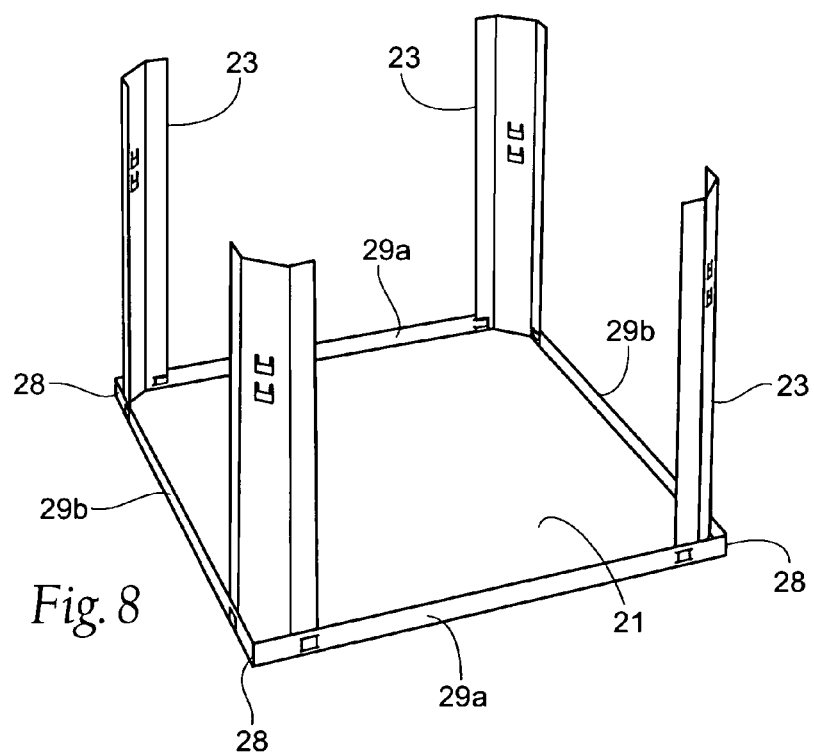
FIG. 8 is a perspective view of the stand according to FIG. 1, and with each of the four leg members being respectively shown secured to the respective angularly juxtaposed corner flanges of the tabletop.

A typical four-legged version of the stand 20, and its preferred rectangular tabletop 21 is illustrated, as previously stated, in its assembled upright version in FIG. 1. The individual components required for assembly of the version of FIG. 1 are illustrated in the exploded view of FIG. 2. With reference to FIG. 2, each of the components; namely a rectangular version of the tabletop 21, the individual leg members 23, and the crossbars 25, are preferably die pressed from a single source, for instance, a galvanized 18 gauge, sheet steel stock for simplicity of ordering, inventory control and for facile fabrication and assembly. Means for securing each of the various cooperating components to one another, and to the tabletop 21, are detailed in the views of FIGS. 3-10, respectively. FIGS. 7 and 8 indicate a preferred method or procedure for assembling and force-fit securement of the components relative to one another. The aforementioned alternative version of the improved stand of the invention is specifically disclosed in the view of FIG. 11.

More specifically, the novel stand 20 comprises four substantially identical leg members 23, a pair of cruciform crossbars 25 and the table top 21. As previously mentioned, these components are each preferably sheared and fabricated from a single sheet of galvanized steel sheet stock. This particular chosen 18 gauge sheet material is preferred, since it is applicable for both stamping and forming the rectangular configuration of the tabletop 21, and of each of the die-pressed leg members 23 and the crossbars 25. Fabrication of each member of the cooperating elements requires use of a minimum number of compressing cutters and tools, as well as a minimum number of position changes of the materials to be stamped and formed to accomplish the desired configuration for preassembly and assembly of components.

As previously mentioned, a very important aspect and object of this invention is the application and use of a singular, independently manufactured, fastening and securing device, such as the removable crossbar fastener nut and bolt assembly 27, is located centrally of the cruciform intersecting crossbars 25, and shown preferably in cruciform relationship in the exploded view of FIG. 2. This stabilizing arrangement of cooperating components, and the singular fastening means for securely joining together the stabilizing crossbars 25 in relative cruciform position, provides minimal effort and extensive savings of time and labor during manufacturing, shipment and on-site assembly of the simplified and less costly supporting stand 20.

The convenient and novel means for detachably securing together the cooperating support and stabilization of components of the stand 20 are shown and set forth in detail in the view of FIGS. 3-6, inclusive. The preferred rectangular tabletop 21 is formed at each of its respective corners with juxtaposed, downwardly bent, peripheral flanges 29a and 29b. The respective flanges 29a, 29b are preferably formed along the marginal borders of each of the sides of the rectangular tabletop 21. The bending action may obviously be performed on a conventional sheet metal brake, preferably prior to the lancing and bumping formation of the securing strap-like component 30, details of which are specifically shown in the views of FIGS. 3 and 4. It will also be observed that the respective leg members 23 to be secured to the tabletop 21 are each provided with a longitudinally protruding, tongue-like portion 31 lanced, formed and extending from the upper end of the respective leg members 23. The tongue-like portion 31 is of a selected width insertable within the groove or pocket 32 defined by the underside of the laterally protruding, strap-like formation 30, and which groove or pocket 32 is of a longitudinal dimension capable of receiving the tongue-like formation 31 at the upper end of respective leg member 23 when forcibly insertable therein.

Figure 9:
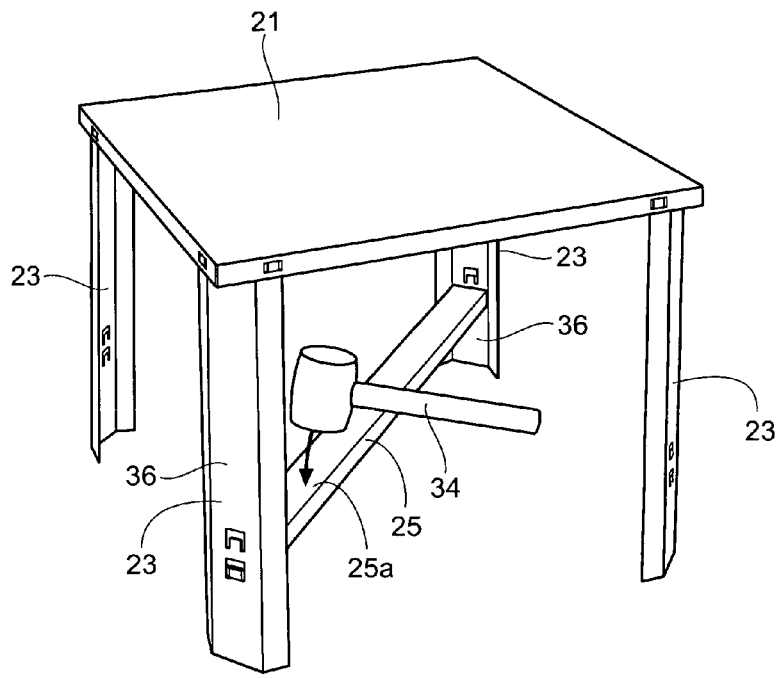
FIGS. 9 and 10 are each perspective views progressively leading to the completed assembly of the stand illustrated in FIG. 1.
Figure 10:
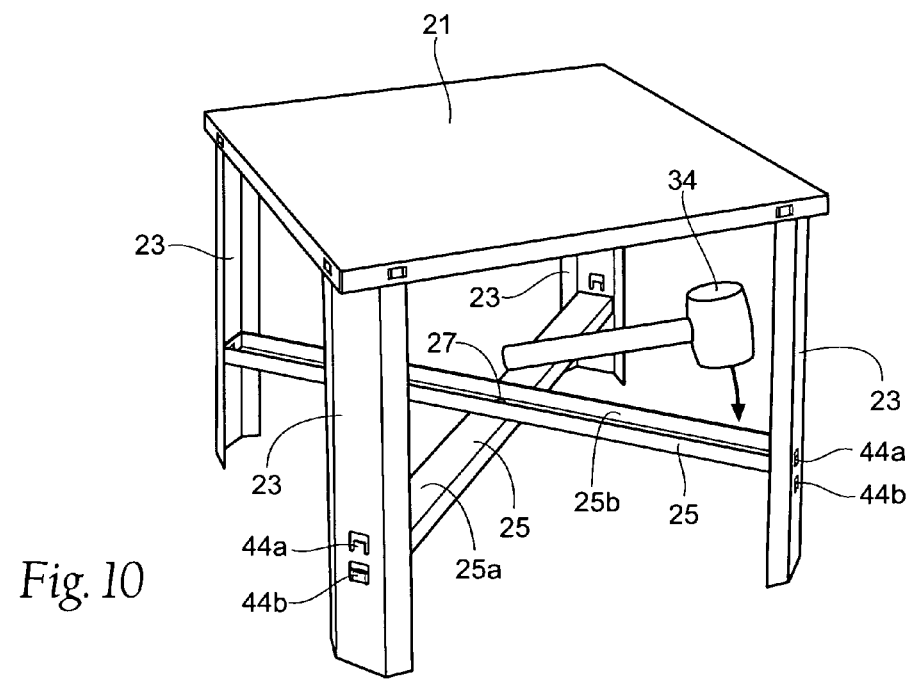

The preferred method for assembling and securing respective leg members 23 into each of the juxtaposed corner securement components 30 is readily achieved by inverting the tabletop 21 and positioning the inverted flange component 30 upside down, as exhibited in FIGS. 7 and 8. Next, the assembler of the stand 20 inserts the tongue-like portion 31 of the inverted selected leg member 23 into the groove 32 formed by the underside of the strap-like component element 30 of the respective downwardly extending angularly juxtaposed, flanged surfaces 29a and 29b. The assembler simply forcibly inserts the tongue-like portion 31 of each leg member 23 into the respective securing groove 32 formed in each of the intersecting angularly juxtaposed flanges 29a and 29b, using a simple, manually held, mallet 34, or the like. A sub-assembled, preferred embodiment of the inverted stand 20 is shown in FIG. 8, awaiting further assembly of the stabilizing crossbars 25, as illustrated in the views of FIGS. 9 and 10.

Figure 5:
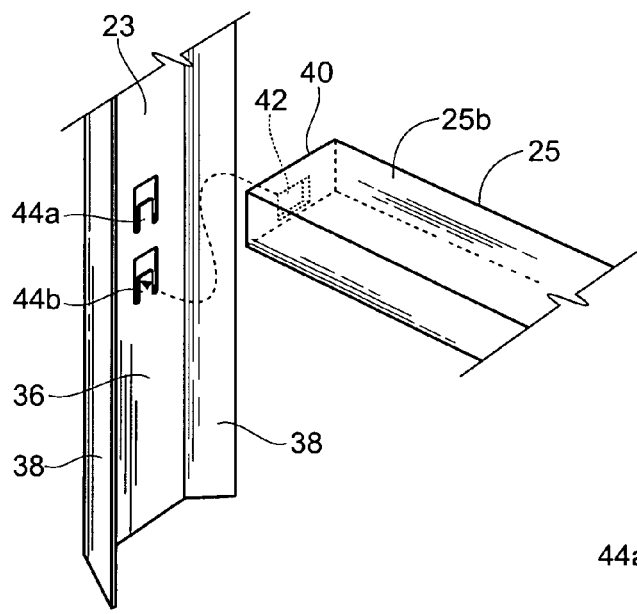
FIG. 5 is an exploded, partial perspective view, illustrating the relative position of a lowermost crossbar with respect to an upright leg member just prior to insertion and secure positioning of the crossbar with respect to a preselected leg member of the illustrated assembled stand of FIG. 1.
Figure 6:
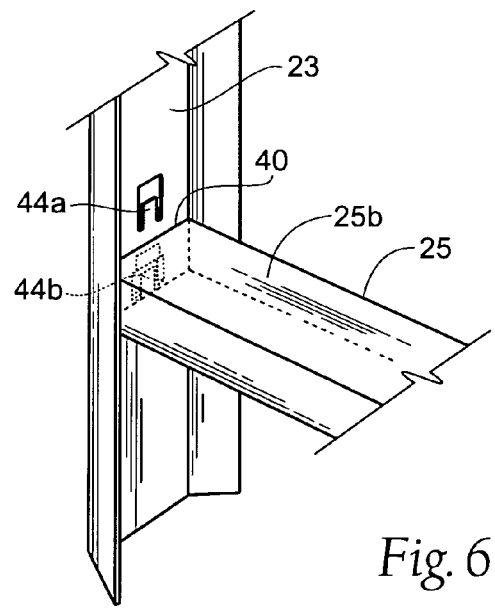
FIG. 6 is a partial perspective view of the completed installation of a lower crossbar with respect to the leg member of FIG. 5.

In order to ensure a stabilizing and secure arrangement of detachable components of the stand 20, it will be noted that a cruciform formation of the intersecting, stabilizing crossbars 25 is preferred for detachable insertion of the opposite ends of a respective crossbar 25 with oppositely located leg members 23 (see FIGS. 5 and 6). This novel and beneficial arrangement for stabilization and releasable securement of the cooperating components makes for an improved, easily assembled stand 20, and of cooperating, relatively flat, components capable of relatively inexpensive packaging and shipping ready for on-site assembly and use thereof. With each of the disassembled components of the stand 20 comprising a tabletop 21, corner leg members 23, appropriate crossbars 25 are joined together at their respective, centralized, coaxially disposed, openings 26, using a single, independently manufactured, bolt and nut assembly 27. This arrangement provides a relatively rigid, stabilized, unit formed from otherwise relatively flexible sheet metal elements. If desired, and if available, this novel, singular fastener may take the form of spot welding, or by means of a simple drilling and riveting operation at the same location 26 as the aforementioned and illustrated bolt and nut fastener unit 27.

The details of the leg members 23 are also herein described with particular reference to FIG. 2. Each leg member 23 is preferably formed from a galvanized steel sheet of the same 18 gauge as that of the tabletop 20. This choice of materials and their respective thicknesses obviously provide an ideal selection of stock material for discount procurement and inventory and ease of on-site installation. With particular reference to the individual leg members 23, illustrated in FIG. 2, the leg members 23 are the stamped and impressed with a preferred formation of individual areas defining a centrally located, longitudinally extending, portion 36 and a pair of inherently formed, angularly, upended, coextensive, flanged portions 38. The flanged portions 38 are each bent outwardly at an angle α, of preferably 45 degrees. This angular arrangement permits relatively flush mating of matching surfaces of each flanged portion 38 with respective inner corner surfaces of the intersecting, angularly disposed, tabletop flanges 29a and 29b (See FIG. 3).

The fastening and securing arrangement of the stabilizing crossbars 25 with a respective one of the supporting, oppositely disposed, pair of leg members 23, is accomplished by joining a respective end 40 of a respective crossbar 25 (see FIGS. 5 and 6) to the fastening means formed in a preselected intermediate vertical areas of the central portion 36 of a respective leg member 23. Each of the ends 40 of a respective crossbars 25 are also provided with an integrally formed, lanced and bumped out, strap-like area 42, similar to the previously mentioned strap-like area 30 of the downwardly bent tabletop corner flanges 29a and 29b. The strap-like portions 42 (see FIG. 5), just as in the case of the strap-like portions 30 (see FIG. 1) of the leg members 23, each protrude outwardly to form a groove 42 sized to receive inwardly directed, upper and lower tongue-like projections 44a or 44b, as will be apparent from the view of FIG. 5. The lower tongue-like member 44b is arranged, as shown in FIG. 6, to receive the upwardly directed end 40 of the crossbar member 25 with the exposed side 25b facing downwardly, and with the open end 25a facing upwardly to minimize the total thickness of mating bottom surfaces 25a. This face-to-face mating surface arrangement of the respective intersecting crossbars 25 also serves to minimize the screw length of the single nut and bolt assembly 27 securing the conjoined cruciform crossbars 25.

Next, with reference to FIGS. 9 and 10, it will be observed that each of the crossbars 25 are respectively seated in the upper and lower tongue-like portions 44a and 44b, formed in the central portion 36 of each leg member 23. Each end of the lower crossbar member 25 is secured to the lower, tongue-like, portion 44b of the respective, oppositely disposed leg members 23, and is located, as mentioned previously, with the respective bottoms of each of the crossbars 25 in mating cruciform relationship with the open side of the upper crossbar 25 facing upwardly and being forcibly secured to the tongue-like portion 44a. The lower crossbar member 25 is secured to the tongue-like portion 44b of the respective leg portions 23. As illustrated, the forced fit securement of the crossbar members 25 and their respective leg members 23 is accomplished by an assembler using the hand-held mallet 34. The bolt 27b of the nut and bolt assembly 27 (see FIG. 2) is then inserted and assembled into the respective holes 26 of each of the crossbars 25 and secured tightly together to securely join the mating surfaces of the cruciform arrangement.

A representative stand 20, according to the present invention and description set forth above, is preferably fabricated from sheet metal stock stamped from 18 gauge galvanized sheet stock and forming a 21 inch square tabletop 21 with 0.75 inch marginal flanges 29a and 29b. The leg members 23 are preferably of a length measuring 18 inches, with each crossbar 25 extending 27½ inches in length. The preferred threaded bolt and nut crossbar fastener 27a, 27b comprise a ½" long, ¼" diameter threaded bolt 27a and corresponding threaded nut 27b. These dimensions have been found satisfactory for purposes of supporting a 60 gallon capacity water heater, when filled with water to be heated.

I claim:

1. A collapsible stand suitable for elevational support of a water heater or similar tank container, and comprising:
   a sheet, substantially planar, tabletop, said tabletop being formed to include at least one downwardly depending flange;
   at least one pair of oppositely disposed leg members, each leg member being independently formed from sheet material and configured to provide a longitudinally extending, integrally formed, central portion, said central portion further extending in laterally opposed directions to provide oppositely disposed, longitudinally coextensive marginal flanges, said marginal flanges each being bent angularly relative to said central portion and relative to one another to provide inherent lateral sidewise strength along the longitudinal axis of said respective leg member;
   cooperating coupling means for detachably coupling each leg member to mate in force-fit relationship with the downwardly depending tabletop flange; and
   wherein the cooperating coupling means comprises a laterally protruding, strap formation in each flange of a respective pair of angularly juxtaposed table top flanges, said formation being laterally spaced from a side surface of said flange to provide an open-ended receptacle area, and a tongue projection extending endwise of the upper end of each of said longitudinal marginal flanges of said leg member, and being adapted for force-fit relationship within the open-ended receptacle area of said leg member.

2. The collapsible stand of claim 1, including two pairs of oppositely disposed leg members and a pair of independent crossbar members, each crossbar member being stamped and formed of sheet material and having an integrally formed, longitudinally extending, central portion and parallel, substantially perpendicular, integrally formed, angularly bent side portions coextensive with said central portion and being arranged in substantially cruciform relationship, said crossbars having detachable means for coupling together the opposite ends of respective crossbars to respective oppositely disposed leg members, and
   a singular attachment fastener for securing the crossbars together at their respective cruciform juncture cross over location.

3. The collapsible stand of claim 1, wherein each of said tabletop, said leg members and of said crossbars are respectfully stamped and formed of substantially identical gauge, sheet material.

4. The collapsible stand of claim 3, wherein said sheet material is formed from galvanized sheet steel stock.

5. The stand of claim 1, wherein each of said angularly disposed leg member flanged portions are bent to be coplanar with the angularly disposed tabletop flanges and being further formed to provide an integrally formed, longitudinally extending, protruding strap portion, and wherein each of the integrally formed leg member flanges as configured to provide endwise extending, tongue extensions configured to be forcibly insertable within the respective receptacle areas defined by the protruding respective leg strap portion.

6. The stand of claim 1, wherein the said tabletop is rectangular in form, and wherein said tabletop flanged portions are each independently integrally formed and each of which extend downwardly from selected marginal areas to define juxtaposed, right angular, side flanges defining the rectangular configuration of said tabletop.

7. The stand of claim 1, wherein the respective ones of said leg members are positioned in opposed relationship and are respectively positioned in facing relationship at opposite ends of a stabilizing, detachable crossbar member, the opposite ends of said crossbar being formed to provide endwise integrally formed punched and lanced protruding, strap portions, said strap portions defining an open-ended groove sized to forcibly receive upwardly and integrally formed, endwise extending, tongue portions lanced, punched, and formed inwardly and intermediate the ends of facing sides of said leg members.

8. The stand of claim 7, wherein said stand includes four (4) supporting leg members and a pair of cruciform stabilizing crossbars having opposite ends thereof removably attachable to respective leg members, and, wherein said crossbars are attached together at a common location intermediate the ends of each of their respective lengths.

9. The stand of claim 8, wherein said cruciform attachment of the respective crossbars consists of a coaxial opening in said respective common central locations, and wherein each of said coaxial openings is arranged to receive a coaxially disposed single bolt and nut assembly for accomplishing said attachment.

* * * * *